United States Patent
Kuo et al.

(10) Patent No.: US 7,894,551 B2
(45) Date of Patent: Feb. 22, 2011

(54) MODULATION SCHEME DETECTING APPARATUS AND RELATED METHOD

(75) Inventors: Chun-Ming Kuo, Taipei Hsien (TW); Ho-Chi Huang, Hsin-Chu Hsien (TW)

(73) Assignee: MediaTek Inc., Science-Based Industrial Park, Hsin-Chu Hsien (TW)

( * ) Notice: Subject to any disclaimer, the term of this patent is extended or adjusted under 35 U.S.C. 154(b) by 1430 days.

(21) Appl. No.: 11/162,090

(22) Filed: Aug. 29, 2005

(65) Prior Publication Data

US 2007/0047587 A1     Mar. 1, 2007

(51) Int. Cl.
    *H03K 9/06* (2006.01)
(52) U.S. Cl. .................... 375/322; 370/497; 329/345
(58) Field of Classification Search .................. 375/322; 370/497; 329/345
    See application file for complete search history.

(56) References Cited

U.S. PATENT DOCUMENTS

| | | | |
|---|---|---|---|
| 6,167,099 A | 12/2000 | Rader | |
| 6,389,040 B1 | 5/2002 | Viswanathan | |
| 6,400,928 B1 | 6/2002 | Khullar et al. | |
| 6,445,745 B1 | 9/2002 | Bontu | |
| 6,463,107 B1 | 10/2002 | Lindoff et al. | |
| 6,473,506 B1 | 10/2002 | Hook et al. | |
| 6,665,348 B1 | 12/2003 | Feher | |
| 6,717,934 B1 | 4/2004 | Kaasila | |
| 2004/0096012 A1 | 5/2004 | Yang | |
| 2005/0084040 A1* | 4/2005 | Stewart et al. | 375/324 |
| 2005/0111596 A1* | 5/2005 | Olsson et al. | 375/346 |
| 2005/0254600 A1* | 11/2005 | Chen et al. | 375/324 |
| 2006/0215789 A1* | 9/2006 | Ghosh et al. | 375/329 |
| 2007/0041473 A1* | 2/2007 | Chen et al. | 375/329 |

FOREIGN PATENT DOCUMENTS

| | | |
|---|---|---|
| TW | I226587 | 1/2005 |
| TW | I236822 | 7/2005 |

OTHER PUBLICATIONS

Azzouz, "Automatic Identification of Digital Modulation Types" Signal Processing 1995; pp. 55-69.*

* cited by examiner

*Primary Examiner*—Juan A Torres
(74) *Attorney, Agent, or Firm*—Winston Hsu; Scott Margo

(57) ABSTRACT

A modulation scheme detecting apparatus includes a first power estimating module, a second power estimating module and a decision module. The first power estimating module is utilized for evaluating a first nominal power of the received signal rotated by a first predetermined phase according to a first modulation scheme. The second power estimating module is utilized for evaluating a second nominal power of the received signal rotated by a second predetermined phase according to a second modulation scheme. The decision module is coupled to the first power estimating module and the second power estimating module, and is utilized for selecting a target modulation from the first and second modulation schemes according to the first nominal power and the second nominal power.

20 Claims, 3 Drawing Sheets

MODULATION SCHEME DETECTING APPARATUS AND RELATED METHOD

BACKGROUND

The invention relates to an apparatus and related method applied in an Enhanced General Packet Radio Service (EGPRS) system, and more particularly, to a modulation scheme detecting apparatus and related method applied in an EGPRS system.

In EGPRS communication systems, each data block is encoded and modulated according to a designated modulation and coding scheme (i.e., MCS-1, MCS-2, MCS-3, MCS-4, MCS-5, MCS-6, MCS-7, MCS-8, or MCS-9). The EGPRS communication system adopts two kinds of modulation schemes. The first modulation scheme is Gaussian Minimum Shift Keying (GMSK), and the second scheme is 8-phase shift keying (i.e., 8-PSK or EPSK). In order to obtain higher throughput in a wireless environment, the selection of modulation schemes is dependent on the channel conditions and the requirement of services, such as data rate. In EGPRS communication systems, one encoded data block is modulated and transmitted over four successive bursts according to the same modulation scheme. The receiver of the EGPRS communication system has no idea about what scheme is utilized in advance. Therefore, to correctly read the received data, the receiver must detect the modulation scheme utilized by the transmitter.

One simple way to determine the modulation type is to use some kind of signaling between the transmitter and the receiver to indicate which modulation type is being used. However, this signaling decreases the information data rate and may therefore not be desirable. Another way to solve the problem without the need for additional signaling from the transmitting end is so-called blind modulation detection method, requiring both a GMSK demodulator and an 8-PSK demodulator in the receiver. The GMSK demodulator demodulates the received signal to generate a plurality of first data, and the 8-PSK demodulator demodulates the received signal to generate a plurality of second data. Then, one of first data and second data is selected according to the reception quality. For example, the one having the less number of error counts is selected. Since the GMSK and the 8-PSK demodulators are active simultaneously, significantly large memory space and computation effort are required. When available power consumption is taken into consideration for general mobile handsets, this conventional method apparently cannot meet user's need.

Therefore, there is a need for an efficient modulation detection technique that, in a simple and reliable way, detects the type of modulation used before the data demodulation is activated.

SUMMARY

It is therefore one of the objectives of the claimed invention to provide a modulation scheme detecting apparatus and related method with lower complexity and better performance.

According to the present invention, a modulation scheme detecting apparatus is disclosed. The modulation scheme detecting apparatus determines a target modulation scheme used for demodulating a received signal. The modulation scheme detecting apparatus comprises: a first power estimating module, for evaluating a first nominal power of the received signal rotated by a first predetermined phase according to a first modulation scheme; a second power estimating module, for evaluating a second nominal power of the received signal rotated by a second predetermined phase according to a second modulation scheme; and a decision module, coupled to the first power estimating module and the second power estimating module, for selecting the target modulation from the first and second modulation schemes according to the first nominal power and the second nominal power.

According to the present invention, a modulation scheme detecting method is disclosed. The modulation scheme detecting method determines a target modulation scheme used for demodulating a received signal. The modulation scheme detecting method comprises: (a) evaluating a first nominal power of the received signal rotated by a first predetermined phase according to a first modulation scheme; (b) evaluating a second nominal power of the received signal rotated by a second predetermined phase according to a second modulation scheme; and (c) selecting the target modulation from the first and second modulation schemes according to the first nominal power and the second nominal power.

Firstly, the present invention calculates the first nominal power and the second nominal power. Next, as each nominal power corresponds to different modulation schemes, the decision module determines the modulation scheme by comparing the first and second nominal powers. Since the operation of generating the nominal power is less complex than in the related art, the amount of required computation power and memory space are reduced.

These and other objectives of the present invention will no doubt become obvious to those of ordinary skill in the art after reading the following detailed description of the preferred embodiment that is illustrated in the various figures and drawings.

DETAILED DESCRIPTION

For illustrative purposes, the following description is directed to a cellular radio communication system, but it will be understood that this invention is not so limited and applies to other types of communication systems. One example of the cellular system using different modulation types is the proposed EGPRS (Enhanced GPRS) system in which GMSK (the modulation type used in GSM systems today) will be used as the robust low data rate modulation and offset 8PSK (EPSK) will be used as the modulation for higher data rates.

Figure 1:
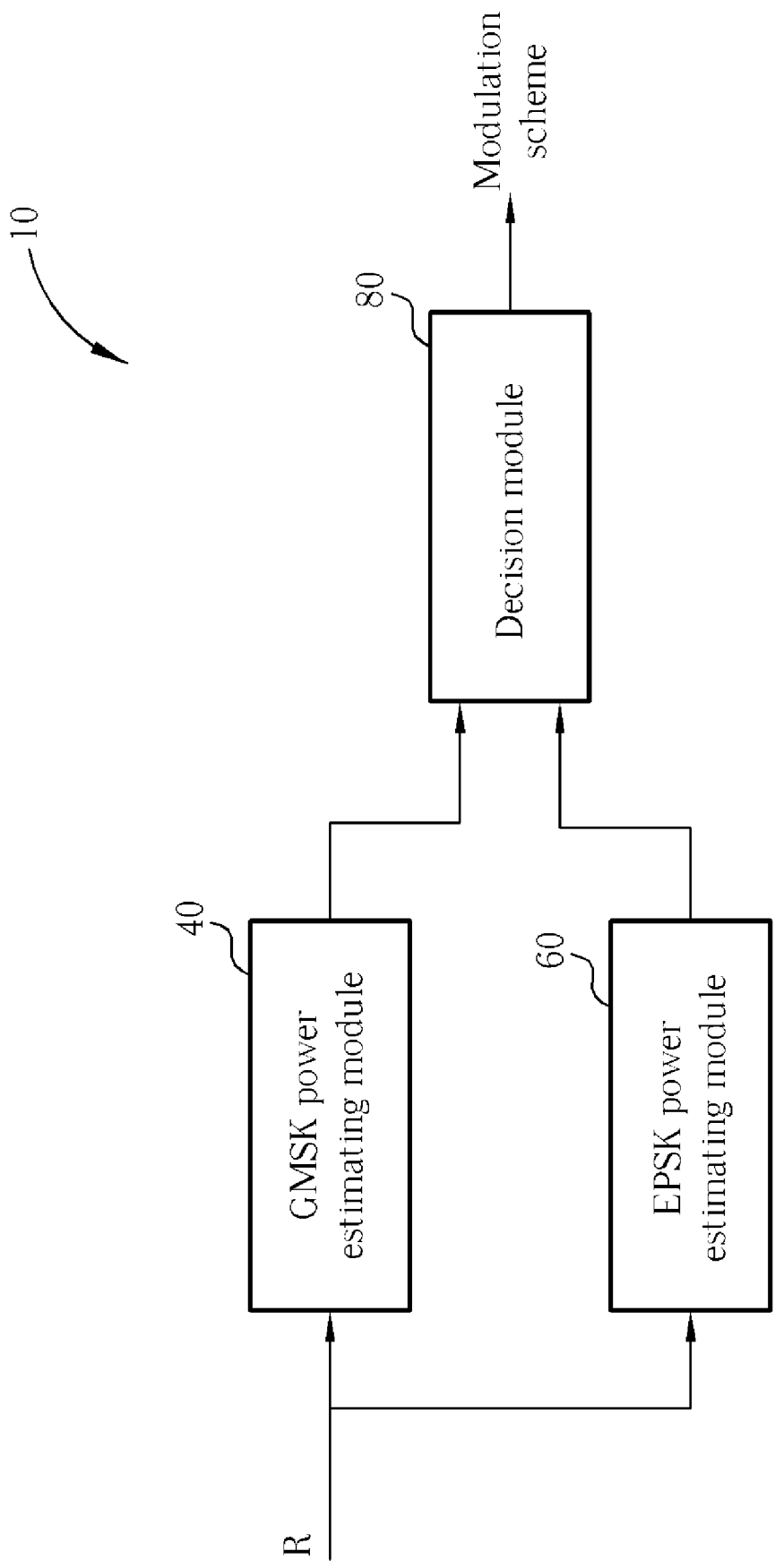
FIG. 1 is a functional block diagram of the modulation scheme detecting apparatus according to a preferred embodiment of the present invention.

Please refer to FIG. 1. FIG. 1 is a functional block diagram of the modulation scheme detecting apparatus 10 according to a preferred embodiment of the present invention. The modulation scheme detecting apparatus 10 is applied in an EGPRS system, and comprises a GMSK power estimating module 40, an 8-PSK power estimating module 60, and a decision module 80. R represents the received signal with the training sequence code. To demodulate the transmitted data by the GMSK modulation, the elements of received data are rotated by $-(n\pi)/2$ radians, which n is the sample index. Here, the GMSK power estimating module 40 then evaluates a nominal power $\eta^2$GMSK of the received signal R rotated by $-(n\pi)/2$ radians. To demodulate the transmitted data by the 8-PSK modulation, the elements of received data are rotated by $-(3n\pi)/2$ radians, which n is the sample index. Here, the 8-PSK power estimating module 60 then evaluates a nominal power $\eta^2$EPSK of the received signal rotated by $-(3n\pi)/8$ radians. Next, the decision module 80 determines the modulation scheme determined by a transmitter according to the nominal powers $\eta^2$GMSK and $\eta^2$EPSK. The operations of generating the nominal powers $\eta^2$GMSK and $\eta^2$EPSK are detailed in the following paragraphs.

Figure 2:
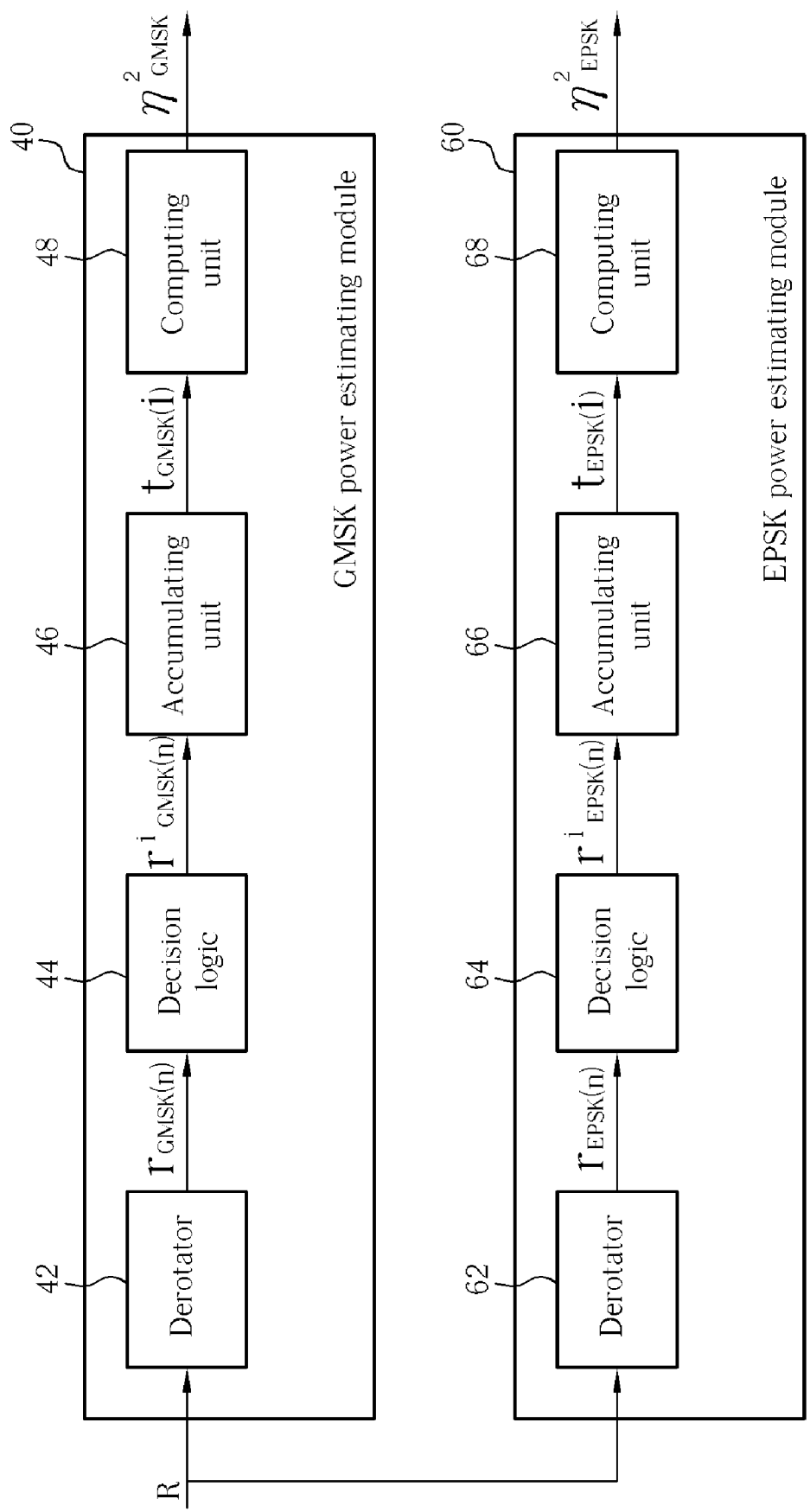
FIG. 2 is a functional block diagram of the GMSK power estimating module and the 8-PSK power estimating module according to the preferred embodiment of the present invention.

Please refer to FIG. 2. FIG. 2 is a functional block diagram of the GMSK power estimating module 40 and the EPSK power estimating module 60 according to the preferred embodiment of the present invention. The GMSK power estimating module 40 comprises a derotator 42, a decision logic 44, an accumulating unit 46, and a computing unit 48. In the EGPRS system, each data block transmitted via the received signal R comprises a plurality of received data r(n), where "n" denotes the input timing of the receiver. The derotator 42 rotates the received data r(n) by $-(n\pi)/2$ radians in a constellation diagram to generate a plurality of data $r_{GMSK}(n)$. The decision logic 44 divides the plurality of data $r_{GMSK}(n)$ into several groups corresponding to states s(n). Each state s(n) can be expressed as the following equation:

$$s(n) = [TSC_m TSC_{m+1} TSC_{m+2}] = 4*TSC_m + 2*TSC_{m+1} + TSC_{m+2} \quad \text{Equation (1)}$$

In Equation (1), $TSC_m$ is the $m^{th}$ bit of known training sequence code provided by the radio link. For simplify, in the present embodiment, the received signals from a 3-tap FIR model channel are assumed, meaning that each state corresponds to three bits. However, it should be noted that the method and system of the present invention could be applied for channels with any taps. As a result, eight kinds of states and eight kinds of groups are utilized in the present embodiment.

In some embodiment, the eight groups can be further reduced into four groups by reducing the states s(n) into s'(n) for better implements. The operation of generating the states s'(n) are represented in the following equation:

$$s'(n) = s(n)\hat{}\,[(s(n)<4)?0:7] \quad \text{Equation (2)}$$

In Equation (2), the operator ^ is an operation with exclusive-OR. The sign of the received data r(n) will then be changed after phase derotation according to s(n). For example, a plurality of data $r_{GMSK}(n)$ having the same absolute values are classified into the same group, in order to decrease the number of groups and increase the number of the elements of each group. In the present embodiment, if the bits correspond to two states are complementary to each other, such as binary bits "100" and binary bits "011", the two states correspond to the same group. For example, a data $r_{GMSK}(p)$ corresponding to a state expressed as bits "100" and a data $r_{GMSK}(q)$ corresponding to a state expressed as bits "011" are classified in the same group. The operation of the decision logic 44 according to the present embodiment is represented by the following equation:

$$r_{GMSK}'(n) = -sgn[s(i)XOR2^{n-1}] \cdot r_{GMSK}(n) \quad \text{Equation (3)}$$

Then, the decision logic 44 further divides the data $r_{GMSK}'(n)$ into 4 groups as mentioned in the previous embodiment.

The accumulating unit 46 generates a plurality of accumulated values $t_{GMSK}(i)$ corresponding to each state by accumulating the data $r_{GMSK}(n)$ in the same group, wherein "i" denotes the index of the group. The operation of the accumulating unit 46 is represented by the following equation:

$$t_{GMSK}(i) = \sum_n r_{GMSK}^i(n) \quad \text{Equation (4)}$$

In Equation (4), $r_{GMSK}^i(n)$ denotes the data $r_{GMSK}(n)$ or $r_{GMSK}'(n)$ divided into the $i^{th}$ group. Finally, the computing unit 48 generates a weighted average of the accumulated values $t_{GMSK}(i)$. As more data $r_{GMSK}(n)$ corresponds to a specific group (i.e., i=m), the weight of the accumulated value $t_{GMSK}(m)$ increases. In the present embodiment, the weighted average is the nominal power $\eta_{GMSK}^2$. The operation of the computing unit 48 is represented by the following equation:

$$\eta_{GMSK}^2 = \frac{1}{N} \sum_i N^i \left| \frac{t_{GMSK}^i}{N^i} \right|^2 \quad \text{Equation (5)}$$

$$= \frac{1}{N} \sum_i |(N^i)^{-0.5} \cdot t_{GMSK}^i|^2$$

In Equation (5), N denotes the total number of the data $r_{GMSK}(n)$, and $N_i$ denotes the number of a plurality of data $r_{GMSK}^i(n)$ divided into the $i^{th}$ group. $(N^i)^{-0.5}$ can be pre-calculated for each training sequence code as static ROM table.

The 8-PSK power estimating module 60 comprises a derotator 62, a decision logic 64, an accumulating unit 66, and a computing unit 68. The derotator 62 rotates the received data r(n) by $-(3n\pi)/8$ radians in a constellation diagram to generate a plurality of data $r_{EPSK}(n)$. The decision logic 64 divides the data $r_{EPSK}(n)$ into several groups as the decision logic 44. The accumulating unit 66 accumulates the data $r_{EPSK}(n)$ in the same group to generate a plurality of accumulated values $t_{EPSK}(i)$ corresponding to each state, wherein "i" denotes the group index. Finally, the computing unit 68 generates a weighted average of the accumulated values $t_{EPSK}(i)$. In the present embodiment, the weighted average is the nominal power $\eta_{EPSK}^2$. Since the operations of the decision logic 64, the accumulating unit 66, and the computing unit 68 are the same as the components of the same names in the GMSK power estimating module 40, detailed descriptions are omitted for brevity.

In an embodiment of the present invention, if the nominal power $\eta_{GMSK}^2$ is greater than the nominal power $\eta_{EPSK}^2$, the target modulation scheme is determined to be the GMSK modulation scheme; otherwise, the target modulation scheme is determined to be the 8-PSK modulation scheme.

In another embodiment of the present invention, a cost function $C_k$ is further calculated according to the nominal power $\eta_{GMSK}^2$ and $\eta_{EPSK}^2$ based on the following equation:

$$C_k = \eta_{GMSK}^2(k) - \eta_{EPSK}^2(k) \quad \text{Equation (6)}$$

In Equation (6), k represents the index of each burst. Here, the target modulation scheme is determined by comparing the cost function $C_k$ with a predetermined threshold. For example, if the cost function $C_k$ is greater than the threshold, the modulation scheme of the burst is GMSK; otherwise, the modulation scheme of the burst is EPSK. It should be understood that the detection method of the present invention is not limited to the above embodiment. Any alternative way to detection the modulation scheme of each burst according to the nominal power $\eta_{GMSK}^2$ and $\eta_{EPSK}^2$ should be covered by the present invention.

However, it is possible that the received signal R might be seriously disturbed by noise, and thus the calculated nominal powers $\eta_{EPSK}^2$ and $\eta_{GMSK}^2$ may be incorrect. Since the modulation scheme for a data block is kept fixed, the same modulation scheme will be used over four successive radio bursts. In order to correct error detection, the decision module 80 observes the nominal powers $\eta_{EPSK}^2$ and $\eta_{GMSK}^2$ of each burst and combines the information of previous bursts to generate a more precise decision of the target modulation scheme.

Figure 3:
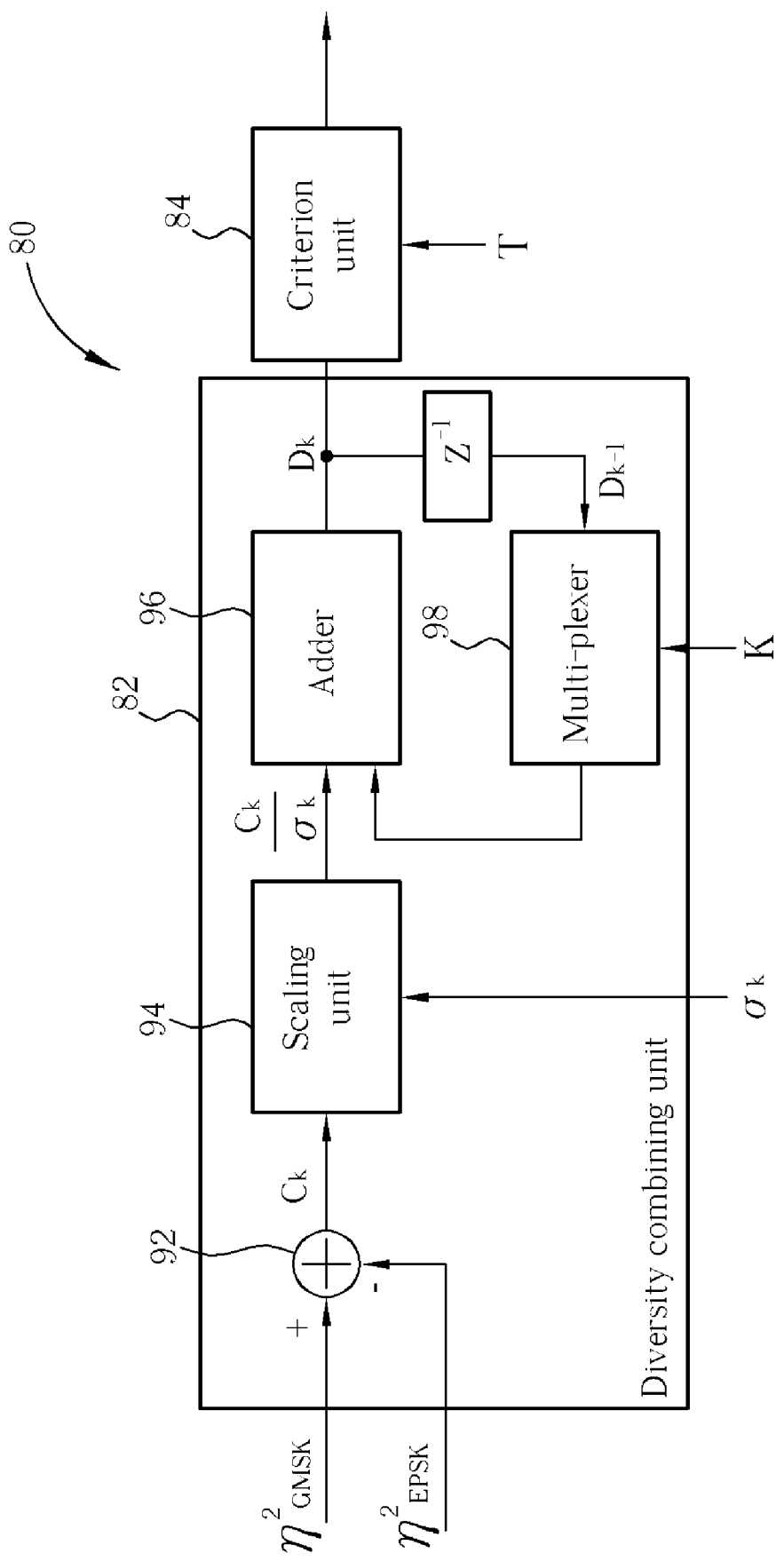
FIG. 3 is a schematic diagram of the decision module according to a preferred embodiment of the present invention.

Please refer to FIG. 3. FIG. 3 is a schematic diagram of the decision module 80 according to a preferred embodiment of the present invention. The decision module 80 comprises a diversity combining unit 82 and a criterion unit 84. The diversity combining unit 82 performs a sequential detection by generating a decision value $D_k$ according to the following equation:

$$D_k = D_{k-1} + \frac{C_k}{\sigma_k^2}, \quad \text{Equation (7)}$$

where $D_{-1} = 0$ and $\sigma_k^2 = E[|r(n)|^2] - \eta_X^2(k)$,

In Equation (7), x may be GMSK or EPSK. When $C_k > 0$, GMSK modulation is adopted and the noise power is estimated as $\sigma_k^2 = E[|r(n)|] - \eta_{GMSK}^2(k)$, and vise versa. The criterion unit 84 determines the target modulation scheme according to the decision value $D_k$. As shown in FIG. 3, the diversity combining unit 82 further comprises a plurality of adders 92, 96, a scaling unit 94, and a multiplexer 98. Firstly, the adder 92 calculates the cost function $C_k$, which is the difference between the nominal powers $\eta_{GMSK}^2$ and $\eta_{EPSK}^2$ of the $k^{th}$ data burst in a data block. Secondly, the scaling unit 94 further calculates the value $$\frac{C_k}{\sigma_k^2}$$

by dividing the cost function $C_k$ by a noise variance value $\sigma_k^2$ of the $k^{th}$ data burst. Thirdly, the adder 96 and the multiplexer 98 add the value $$\frac{C_k}{\sigma_k^2}$$

with the decision value $D_{k-1}$ of the $k-1^{th}$ burst to generate the decision value $D_k$. The operations of the adder 96 and the multiplexer 98 are based on Equation (7) mentioned above. It should be noted that Equation (7) is performed in each data block individually, meaning that the decision value $D_k$ of one data block will not be utilized in other block. That is, k is between 0-3 in this embodiment.

For example, in one data block, if k=0, the multiplexer 98 outputs an initial value $D_{-1}$, then the adder 96 adds the value $$\frac{C_1}{\sigma_1^2}$$

to $D_{-1}$ wherein $D_{-1}$ is equal to zero according to the preferred embodiment. If k>0, the multiplexer 98 outputs the previous decision value $D_{k-1}$, which is the decision value of the $k-1^{th}$ burst, then the adder 96 adds the value $$\frac{C_k}{\sigma_k^2}$$

to the previous decision value $D_{k-1}$. In this invention, the decision value $D_k$ is related to both the value $$\frac{C_k}{\sigma_k^2}$$

and the previous decision value $D_{k-1}$. In other words, not just current burst data in this data block are considered for modulation scheme detection, the previous information of all previous bursts in this data block with the same modulation scheme will also be used to further correct the current decision result. Therefore, with further consideration of previous burst information in the present data block, the reliability of the decision value $D_k$ increases accordingly. Finally, the criterion unit 84 determines the target modulation scheme according to the decision value $D_k$ and a threshold value T. In the present embodiment, T is equal to zero. If the decision value $D_k$ is greater than the threshold value T, the target modulation scheme is determined to be the GMSK modulation scheme. On the contrary, if the decision value $D_k$ is not greater than the threshold value T, the target modulation scheme is determined to be the 8-PSK modulation scheme. Compared with the related art, the modulation scheme detecting apparatus utilizes the nominal powers $\eta_{GMSK}^2$ and $\eta_{EPSK}^2$ to determine the target modulation scheme according to the present invention. The operation of generating the nominal power is obviously simpler than that in the related art and therefore both the computation power and memory requirement are reduced. In addition, the decision module of the modulation scheme detecting apparatus observes the nominal powers $\eta_{EPSK}^2$ and $\eta_{GMSK}^2$ of all bursts in one data block transmitted via the same modulation scheme to determine the target modulation scheme. Therefore the reliability of the modulation scheme detecting apparatus is significantly improved.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A modulation scheme detecting apparatus for determining a target modulation scheme used for demodulating a received signal, the modulation scheme detecting apparatus comprising:
    a first power estimating module, for evaluating a first nominal power of the received signal, wherein the received signal is rotated by a first predetermined phase and is classified by a plurality of first states according to a first modulation scheme;
    a second power estimating module, for evaluating a second nominal power of the received signal, wherein the received signal is rotated by a second predetermined phase and is classified by a plurality of second states according to a second modulation scheme; and
    a decision module, coupled to the first power estimating module and the second power estimating module, for selecting the target modulation scheme from the first and second modulation schemes according to the first nominal power and the second nominal power.

2. The modulation scheme detecting apparatus of claim 1, wherein the first power estimating module comprises:
 a first derotator for rotating a plurality of received data transmitted via the received signal by the first predetermined phase to generate a plurality of first data;
 a first decision logic, coupled to the first derotator, for classifying the first data according to the plurality of first states;
 a first accumulating unit, coupled to the first decision logic, for generating a plurality of first accumulated values corresponding to the first states respectively, wherein a specific first accumulated value corresponding to a specific first state is generated by accumulating a plurality of first data corresponding to the specific first state; and
 a first computing unit, coupled to the first accumulating unit, for computing the first nominal power according to a weighted average of the first accumulated values; and
the second power estimating module comprises:
 a second derotator for rotating the plurality of received data transmitted via the received signal by the second predetermined phase to generate a plurality of second data;
 a second decision logic, couple to the second derotator, for classifying the second data according to the plurality of second states;
 a second accumulating unit, coupled to the second decision logic, for generating a plurality of second accumulated values corresponding to the second states respectively, wherein a specific second accumulated value corresponding to a specific second state is generated by accumulating a plurality of second data corresponding to the specific second state; and
 a second computing unit, coupled to the second accumulated unit, for computing the second nominal power according to a weighted average of the second accumulated values.

3. The modulation scheme detecting apparatus of claim 2, wherein the first computing unit generates the first nominal power $\eta_1^2(k)$ of a $k^{th}$ burst according to the equation $$\eta_1^2(k) = \sum_i |(N^i)^{-0.5} \cdot t_1^i(k)|^2,$$

where $t_1^i(k)$ denotes a first accumulated value of a state i, and $N^i$ denotes the number of accumulated values of the state i, and the second computing unit generates the second nominal power $\eta_2^2(k)$ of the $k^{th}$ burst according to the equation $$\eta_2^2(k) = \sum_i |(N^i)^{-0.5} \cdot t_2^i(k)|^2,$$

where $t_2^i(k)$ denotes a second accumulated value of the state i.

4. The modulation scheme detecting apparatus of claim 2, wherein the received data transmitted via the received signal for rotation by the first derotator and the second derotator is a training sequence of the received signal.

5. The modulation scheme detecting apparatus of claim 1, wherein the first modulation scheme corresponds to a Gaussian Minimum Shift Keying (GMSK) modulation scheme, the second modulation scheme corresponds to an 8-phase shift keying (8-PSK) modulation scheme, the first predetermined phase is equal to $-(n\pi)/2$ radians, the second predetermined phase is equal to $-(3n\pi)/8$ radians, and n is an integer index.

6. The modulation scheme detecting apparatus of claim 5, wherein when the first nominal power is greater than the second nominal power, the decision module determines the target modulation scheme to be the GMSK modulation scheme; otherwise, the decision module determines the target modulation scheme to be the 8-PSK modulation scheme.

7. The modulation scheme detecting apparatus of claim 1 being applied to an Enhanced General Packet Radio Service (EGPRS) system.

8. The modulation scheme detecting apparatus of claim 1, wherein the decision module comprises:
 a diversity combining unit, coupled to the first power estimating module and the second power estimating module, for generating a decision value according to the difference between the first nominal power and the second nominal power of each burst; and
 a criterion unit, coupled to the diversity combining circuit, for determining the target modulation scheme according to the decision value.

9. The modulation scheme detecting apparatus of claim 8, wherein the diversity combining unit generates a decision value $D_k$ based on the equations $$C_k = \eta_1^2(k) - \eta_2^2(k), \text{ and } D_k = D_{k-1} + \frac{C_k}{\sigma_k^2},$$

where k is the index of each burst, $\eta_1^2(k)$ denotes a first nominal power of a $k^{th}$ burst, $\eta_2^2(k)$ denotes a second nominal power of the $k^{th}$ burst, and $\sigma_k^2$ denotes noise power of the $k^{th}$ burst.

10. The modulation scheme detecting apparatus of claim 9, wherein the criterion unit determines the target modulation scheme by comparing the decision value $D_k$ with a predetermined threshold value, when the decision value $D_k$ is greater than the predetermined threshold value, the decision module determines the target modulation scheme to be the GMSK modulation scheme; otherwise, the decision module determines the target modulation scheme to be the 8-PSK modulation scheme.

11. A modulation scheme detecting method, of determining a target modulation scheme used for demodulating a received signal, comprising:
 (a) evaluating a first nominal power of the received signal by a modulation scheme detecting apparatus, wherein the received signal is rotated by a first predetermined phase and is classified by a plurality of first states according to a first modulation scheme;
 (b) evaluating a second nominal power of the received signal by the modulation scheme detecting apparatus, wherein the received signal is rotated by a second predetermined phase and is classified by a plurality of second states according to a second modulation scheme; and
 (c) selecting the target modulation scheme from the first and second modulation schemes according to the first nominal power and the second nominal power by the modulation scheme detecting apparatus.

12. The modulation scheme detecting method of claim 11, wherein step (a) further comprises:
 (e) rotating a plurality of received data transmitted via the received signal by the first predetermined phase;

(f) classifying the first data according to the plurality of first states;
(g) generating a plurality of first accumulated values corresponding to the first states respectively, wherein a specific first accumulated value corresponding to a specific first state is generated by accumulating a plurality of first data corresponding to the specific first state; and
(h) computing the first nominal power according to a first weighted average of the first accumulated values; and step (b) further comprises:
(i) rotating the plurality of received data transmitted via the received signal by the second predetermined phase;
(j) classifying the second data according to the plurality of second states;
(k) generating a plurality of second accumulated values corresponding to the second states respectively, wherein a specific second accumulated value corresponding to a specific second state is generated by accumulating a plurality of second data corresponding to the specific second state; and
(m) computing the second nominal power according to a second weighted average of the second accumulated values.

13. The modulation scheme detecting method of claim 12, wherein a first nominal power $\eta_1^2(k)$ of a $k^{th}$ burst is generated according to the equation $$\eta_1^2(k) = \sum_i \left|(N^i)^{-0.5} \cdot t_1^i(k)\right|^2,$$

where $t_1^i(k)$ denotes a first accumulated values of a state i, and $N^i$ denotes the number of accumulated values of the state i; and a second nominal power $\eta_2^2(k)$ of the $k^{th}$ burst is generated according to the equation $$\eta_2^2(k) = \sum_i \left|(N^i)^{-0.5} \cdot t_2^i(k)\right|^2,$$

where $t_2^i(k)$ denotes a second accumulated values of the state i.

14. The modulation scheme detecting method of claim 12, wherein the received data transmitted via the received signal for rotation by the first derotator and the second derotator correspond to a training sequence of the received signal.

15. The modulation scheme detecting method of claim 11, wherein the first modulation scheme corresponds to a Gaussian Minimum Shift Keying (GMSK) modulation scheme, the second modulation scheme corresponds to an 8-phase shift keying (8-PSK) modulation scheme, the first predetermined phase is equal to $-(n\pi)/2$ radians, the second predetermined phase is equal to $-(3n\pi/8)$ radians, and n is an integer index.

16. The modulation scheme detecting method of claim 15, wherein when the first nominal power is greater than the second nominal power, the target modulation scheme is determined to be the GMSK modulation scheme; otherwise, the target modulation scheme is determined to be the 8-PSK modulation scheme.

17. The modulation scheme detecting method of claim 11 being applied to an Enhanced General Packet Radio Service (EGPRS) system.

18. The modulation scheme detecting method of claim 11, wherein step (c) comprises:
generating a decision value according to the difference between the first nominal power and the second nominal power of each burst; and
determining the target modulation scheme according to the decision value.

19. The modulation scheme detecting method of claim 18, wherein the diversity combining unit generates the decision value based on the equations $$C_k = \eta_1^2(k) - \eta_2^2(k), \text{ and } D_k = D_{k-1} + \frac{C_k}{\sigma_k^2},$$

where k denotes the index of each burst, $\eta_1^2(k)$ denotes a first nominal power of a $k^{th}$ burst, $\eta_2^2(k)$ denotes a second nominal power of the $k^{th}$ burst, $\sigma_k^2$ denotes a noise power of the $k^{th}$ burst, and $D_k$ denotes a decision value of the $k^{th}$ burst.

20. The modulation scheme detecting method of claim 19, wherein the criterion unit determines the target modulation scheme by comparing the decision value $D_k$ with a predetermined threshold value, when the decision value $D_k$ is greater than the predetermined threshold value, the target modulation scheme is determined to be the GMSK modulation scheme; otherwise, the target modulation scheme is determined to be the 8-PSK modulation scheme.

* * * * *